United States Patent [19]

Glenn

[11] Patent Number: 4,701,783
[45] Date of Patent: Oct. 20, 1987

[54] TECHNIQUE FOR ENCODING AND DECODING VIDEO WITH IMPROVED SEPARATION OF CHROMINANCE AND LUMINANCE

[75] Inventor: William E. Glenn, Ft. Lauderdale, Fla.

[73] Assignee: New York Institute of Technology, Old Westbury, N.Y.

[21] Appl. No.: 5,296

[22] Filed: Jan. 20, 1987

Related U.S. Application Data

[63] Continuation of Ser. No. 579,482, Apr. 6, 1984, abandoned, which is a continuation-in-part of Ser. No. 483,126, Apr. 8, 1983, Pat. No. 4,628,344, which is a continuation-in-part of Ser. No. 418,055, Sep. 14, 1982, Pat. No. 4,517,597.

[51] Int. Cl.⁴ .......................................... H04N 11/14
[52] U.S. Cl. ..................................... 358/12; 358/16; 358/31
[58] Field of Search ...................... 358/12, 16, 31, 141

[56] References Cited

U.S. PATENT DOCUMENTS

| | | | |
|---|---|---|---|
| 2,686,831 | 8/1954 | Dome | 358/12 |
| 3,743,766 | 7/1973 | Loose et al. | 358/37 |
| 3,872,498 | 3/1975 | Pritchard | 358/30 |
| 4,068,258 | 1/1978 | Bied-Charreton et al. | 358/310 |
| 4,081,827 | 3/1978 | Hipwell | 358/14 |
| 4,473,837 | 9/1984 | Taemann | 358/12 |
| 4,485,401 | 11/1984 | Tan et al. | 358/141 |
| 4,521,803 | 6/1985 | Gittinger | 358/12 |

FOREIGN PATENT DOCUMENTS 128048  5/1959  U.S.S.R. .............................. 358/12

OTHER PUBLICATIONS

Timney, "Orientation Anisotropy: Incidence and Magnitude in Caucasian and Chinese Subjects", *Science*, vol. 183, pp. 699-701, (1976).
Appelle, "Perception and Discrimination as a Function of Stimulus Orientation", *Psychological Bulletin*, 1972, pp. 266-278.
Wendland, "Extended Definition Television with High Picture Quality", *SMPTE Journal*, Oct. 1983, pp. 1028-1035.
W. E. Glenn et al., "Compatible Transmission of High Definition Television Using Bandwidth Reduction", Proceedings 37th Annual Broadcast Eng. Conf., 4/12/83.
Fujio and Kubota, "Transmission Primaries and Signal Forms", *NHK Technical Monograph*, No. 32, Jun. 1982, pp. 27-34.
Campbell, Kulikowski and Levinson, "The Effect of Orientation on the Visual Resolution of Gratings", *J. Physiology*, 187 (1966), pp. 427-436.
Seyler and Budrikis, "Detail Perception after Scene Changes in Television Image Representations", *IEEE Transactions on Information Theory*, Jan. 1965, pp. 31-43.
Fujio et al., "High-Definition Television System-Signal Standard and Transmission", *SMPTE Journal*, vol. 89, Aug. 1980, pp. 579-584.

*Primary Examiner*—John W. Shepperd
*Attorney, Agent, or Firm*—Martin M. Novack

[57] ABSTRACT

Apparatus and method are disclosed for encoding and decoding a video signal. The standard resolution chrominance and the detail component of standard resolution luminance are encoded and transmitted in a way which allows them to be separated at the receiver without cross color. A conventional type of NTSC transmission is modified by adding together the color and the luminance signals above 2.5 megahertz, the information being repeated for two successive frames, with the color carrier reversed in phase as it normally does. At the receiver, successive frames are added and subtracted to recover the color and the luminance above 2.5 megahertz.

31 Claims, 4 Drawing Figures

TECHNIQUE FOR ENCODING AND DECODING VIDEO WITH IMPROVED SEPARATION OF CHROMINANCE AND LUMINANCE

This is a continuation of U.S. Application Ser. No. 579,482, filed Apr. 6, 1984, now abandoned, which is a continuation-in-part of U.S. Application Ser. No. 483,126 filed Apr. 8, 1983, now U.S. Pat. No. 4,628,344, which is a continuation-in-part of U.S. Application Ser. No. 418,055 filed Sept. 14, 1982 now U.S. Pat. No. 4,517,597.

BACKGROUND OF THE INVENTION

This invention relates to video signals and, more particularly, to apparatus and method for encoding and decoding video signals for use in a compatible high definition television system as well as in other applications.

It is well recognized that it would be desirable to have television exhibit higher definition for the viewer. The Society of Motion Picture and Television Engineers ("SMPTE") convened a study group to study various aspects of high definition television systems, including such systems for use in the home. The SMPTE study group concluded, among other things, that any new service which provides higher definition television than is conventionally broadcast (i.e., more elements per line and lines per frame, and thus a wider bandwidth necessary for transmission) should serve existing home television receivers with essentially all the picture attributes and quality of which the receivers are capable (see SMPTE Journal, Volume 89, No. 3, pp. 153-161, March, 1980). As an example, the study group cited the instance when the NTSC compatible color service was first introduced. Monochrome receivers then in the hands of the public reproduced from the color broadcasts a monochrome version of the broadcast, essentially without compromise either in electronic performance of the receivers or in the quality of the reproduction. The SMPTE study group also noted that receivers designed for new (high definition) service, should be capable of operating using the pre-existing transmissions and derive from them a result not inferior to that provided by pre-existing receivers.

The reports of the SMPTE study group indicated the difficulty of identifying the means by which an acceptable compatible system can be achieved. To applicant's knowledge, no such system has been developed. It is an object of the present invention to set forth a high definition television system which is believed to meet practical requirements of performance and compatibility and have operating parameters sufficiently flexible to fit within standards that are ultimately adopted by television industry.

It is another object of the present invention to provide an encoding and decoding technique that is useful for transmitting or storing video information in a form that requires reduced bandwidth channels or reduced storage size, as the case may be.

It is a further object of the present invention to provide a technique, which takes advantage of characteristics of human vision, for encoding in a new way, transmitted color television signals, such that receivers having a decoder with a frame store (but not necessarily a full high resolution capability) can recover fully separated color and luminance detail.

SUMMARY OF THE INVENTION

The present invention is directed to an apparatus and method for encoding and/or decoding video signals for use in a compatible high definition television system or in other applications. The invention makes use, inter alia, of certain characteristics of human vision. In particular, it has been found that two different types of neurons are used in vision. One type of neuron, whch detects low resolution imagery is relatively sensitive to temporal transients and has a time constant for build-up and decay of information that is believed to be about 40 to 80 milliseconds. A second type of neuron is apparently used for transmitting relatively high resolution information from the fovea. This type neuron is believed to have a time constant of about 200 to 350 milliseconds. Also, it is believed that stimulation of the first type of neuron by a transient will inhibit reception of information from the second type of neuron for a period of 150 to 300 milliseconds. These characteristics of human visual perception allow development of an image transmission system in which the transmission bandwidth can be substantially reduced without degradation of the image as perceived by the viewer. Since rapidly changing information is, as explained, perceived at lower resolution, it is only necessary to transmit this information with the bandwidth necessary to transmit a relatively low (e.g. conventional television) resolution image at, say, 30 frames per second. Since relatively high resolution information can only be perceived in approximately one-fifth to one-third of a second, the bandwidth required to transmit the relatively higher resolution information can be effectively reduced, since an appropriately lower effective frame refresh rate is all that is necessary for its transmission. Since the relatively higher resolution imagery is inhibited after a transient, the eye is not expected to be able to detect the fact that it takes a longer time (e.g. one-fifth to one-third of a second) to present the higher resolution image.

It is generally known that video transmission systems can be provided with a frame store at the transmitting and receiving ends, and certain portions of the video information can be transmitted and stored at the receiver less frequently and then repeated during generation of the video signal at the receiver. The present invention, in addition to improving over such systems by making maximum use of observed human visual perception characteristics, also has the advantage of providing high and low definition versions of the video, if desired, and the further advantage of having the lower definition video be compatible with existing television standards.

In accordance with a feature of an embodiment of the invention, an improvement is set forth of encoding and processing the portion of standard resolution video spectrum above 2.5 MHz where color and luminance information is not adequately separated by conventional color television processing. Briefly, a conventional type of NTSC transmission is modified by adding together the R-Y, B-Y and Y signals above 2.5 megahertz, the information being repeated for two successive frames with the color carrier reversed in phase as it normally does. At the receiver, a frame store can be used to add these same two frames or subtract them. The sum gives the Y signal above 2.5 megahertz without any color signal. (The color signal was made identical for those two frames but the carrier is reversed in phase.) The difference of the two frames gives color without cross color. Since the luminance is identical for the two frames, the difference is zero in this frequency range. With this arrangement, the frame rate for the color and for the luminance above 2.5 MHz is half the conventional frame rate; i.e., 15 frames per second. However, based on applicants psychophysical studies, this will be adequate.

It will be understood that the system of this embodiment is compatible with standard receivers and with "enhanced" (i.e., beyond standard but not full high resolution) receivers which include a frame store and circuitry to decode the consecutive identical frames of color and detail luminance information, to be described. In both cases the slower frame rate for the color information and for the detail luminance information will cause no appreciable degradation is perceived picture quality due to the desired characteristics of human vision. In the enhanced receiver, however, the improved separation of color and detail luminance will be a distinct advantage. This advantage will also be present in a full capability high resolution receiver which further includes the high resolution luminance and color component signals.

Further features and advantages of the invention will become more readily apparent from the following detailed description when taken in conjunction with the accompanying drawings.

DESCRIPTION OF THE PREFERRED EMBODIMENTS

In the description hereof, the teachings of U.S. Pat. Nos. 4,517,597 and 4,628,344, which matured from the parent applications hereof, are incorporated herein by reference.

As described herein, techniques for depicting moving images are developed to take advantage of the slower temporal response of those neurons which handle high resolution information in human vision; and this further reduces the necessary overall bandwidth in a compatiable high definition television system. In accordance with a feature of the present embodiment, an improvement is also set forth of encoding and processing the portion of standard resolution video spectrum above 2.5 MHz where color and luminance information is not adequately separated by conventional color television processing.

. Briefly, a conventional type of NTSC transmission is modified by adding together the R-Y, B-Y and Y signals above 2.5 megahertz, the information being repeated for two successive frames with the color carrier reversed in phase as it normally does. At the receiver, a frame store can be used to add these same two frames or subtract them. The sum gives the Y signal above 2.5 megahertz without any color signal. (The color signal was made identical for those two frames but the carrier is reversed in phase.) The difference of the two frames gives color without cross color. Since the luminance is identical for the two frames, the difference is zero in this frequency range. With this arrangement, the frame rate for the color and for the luminance above 2.5 MHz is half the conventional frame rate; i.e., 15 frames per second. However, based on applicant's psychophysical studies, this will be adequate.

It will be understood that the system of this embodiment is compatible with standard receivers and with "enhanced" (i.e., beyond standard but not full high resolution) receivers which include a frame store and circuitry to decode the consecutive identical frames of color and detail luminance information, to be described. In both cases the slower frame rate for the color information and the for detail luminance information will cause no appreciable degradation in perceived picture quality due to the above described characteristics of human vision. In the enhanced receiver, however, the improved separation of color and detail luminance will be a distinct advantage. This advantage will also be present in a full capability high resolution receiver which further includes the high resolution luminance and color compact signals.

Figure 1:
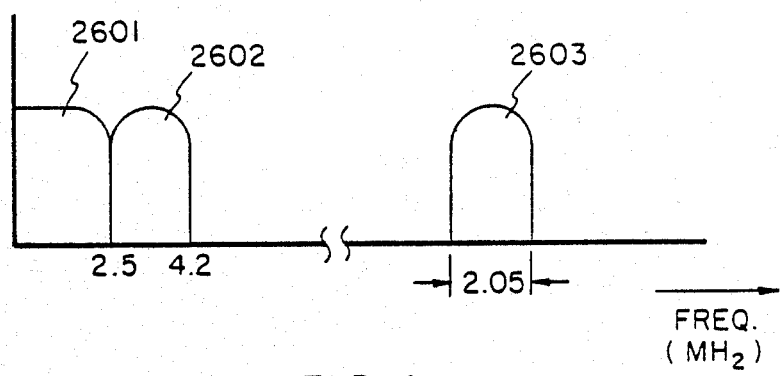
FIG. 1 illustrates the frequency spectrum of a proposed system.

The described modification to the standard NTSC transmission would allow transmission of Y up to 4.2 megahertz and I and Q up to their normal bandwidths without cross-color or cross-luminance. The high resolution luminance and chrominance detail information can be transmitted at an even lower frame rate. One example is to use 7.5 frames per second and diagonal sampling (to take advantage of the oblique effect). The 4.2 megahertz of the modified standard NTSC transmission carries the more rapidly changing low resolution information. Another low bandwidth channel is used to carry the remaining high resolution detail and color information at the 7.5 frames per second rate. FIG. 1 shows the video spectrum of the system. The conventional low frequency channel is used to transmit luminance up to 2.5 megahertz unchanged at 30 frames per second interlaced (band 2601). From 2.5 megahertz to 4.2 megahertz the detail luminance and chrominance are repeated to give 15 frame per second presentation (band 2602). Another frequency band is used to transmit the higher detail luminance and detail chrominance at 7.5 frames per second (band 2603). This additional channel needs the following approximate bandwidth to transmit these detail signals:

| | |
|---|---|
| Y - | 1.30 MHz |
| R-Y - | .60 MHz |
| B-Y - | .15 MHz |
| Total: | 2.05 MHz |

Figure 2:
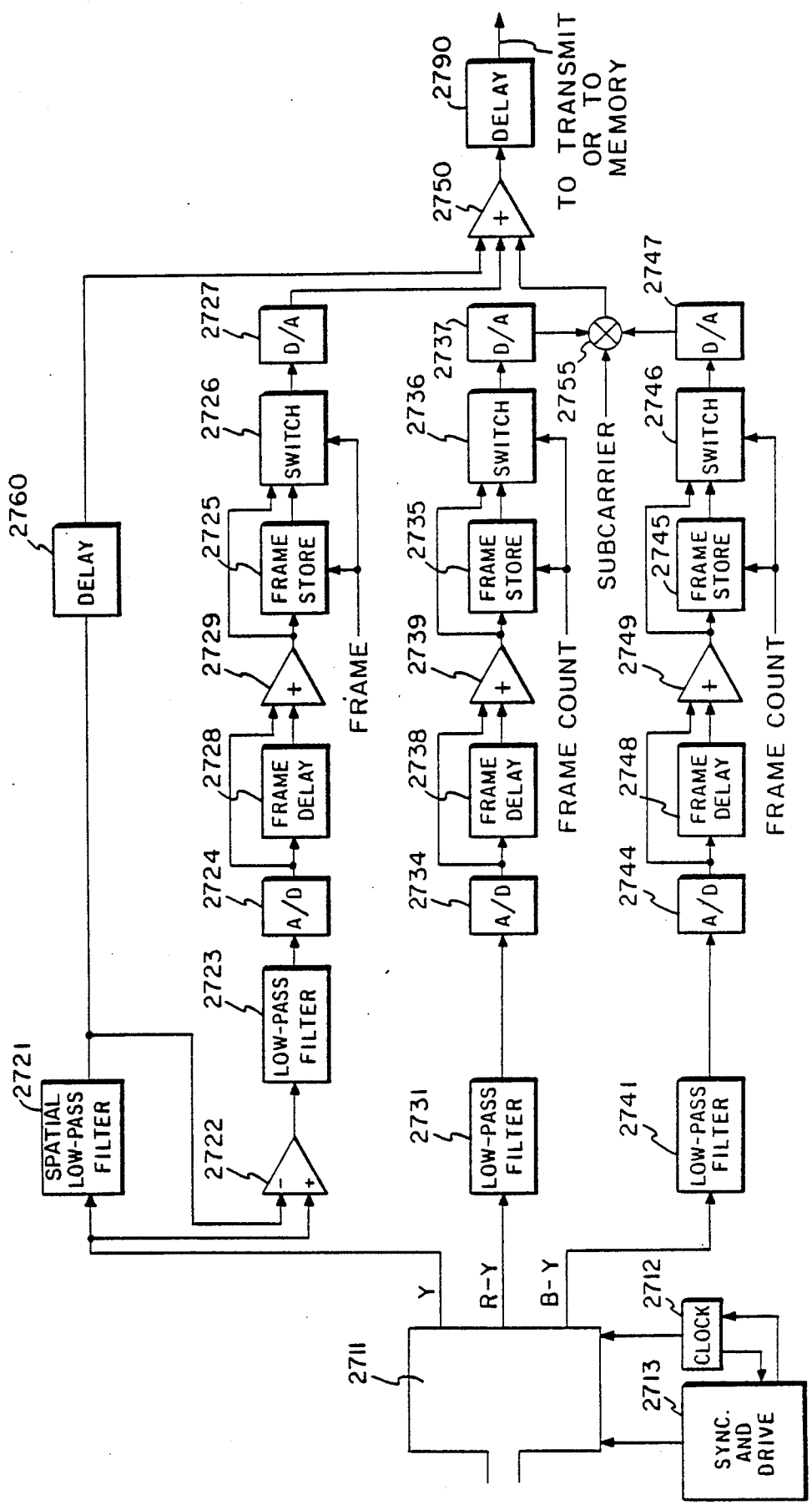
FIGS. 2 and 3 are block diagrams of an encoder in accordance with another embodiment of the invention.
Figure 3:
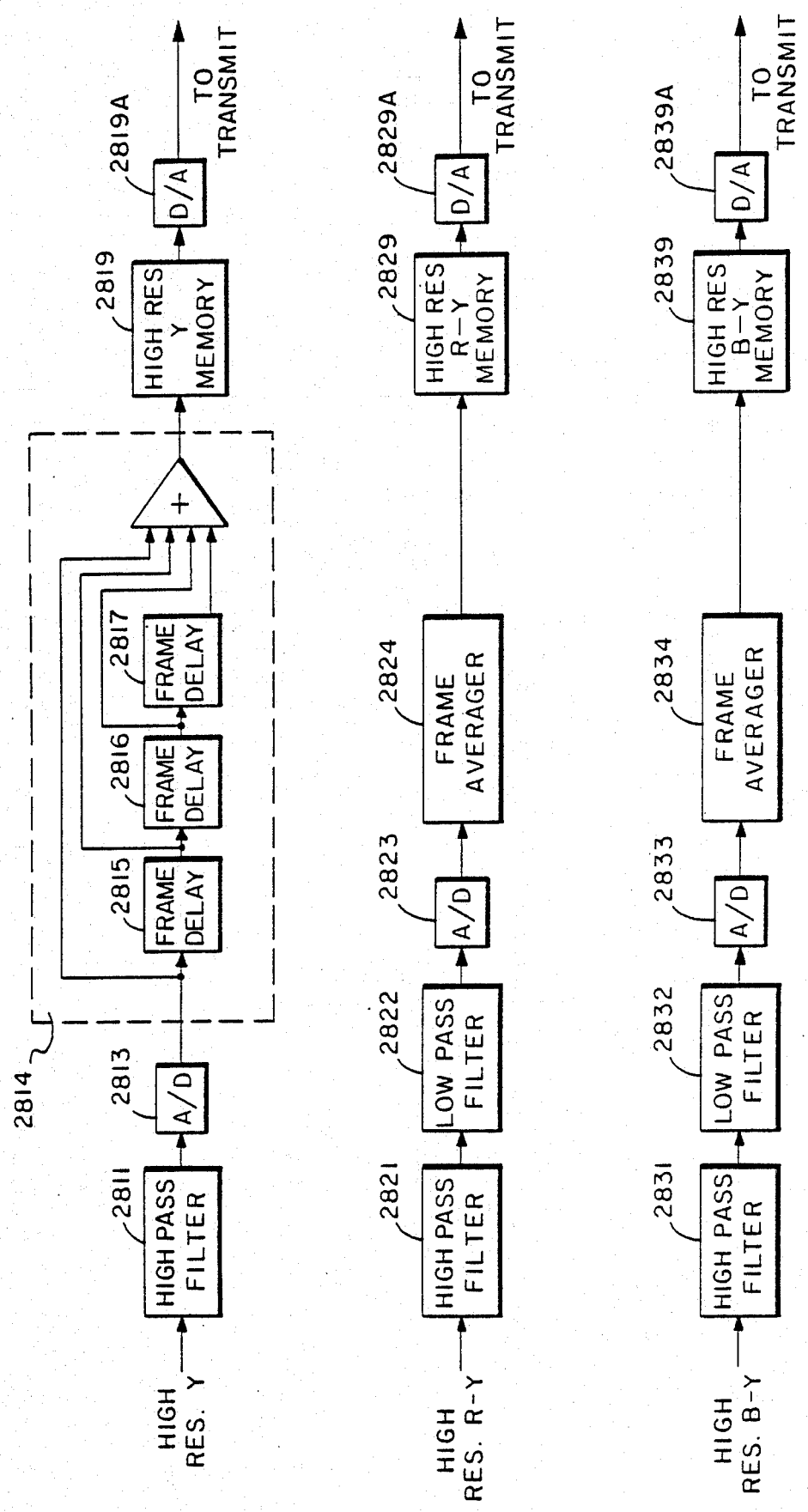

Referring to FIGS. 2 and 3, there is shown a block diagram of an encoder in accordance with the embodiment of the invention which can be used to obtain signals for transmission and/or storage of the type just described, such as in the spectrum of FIG. 1. High resolution color camera and associated circuitry 2711 is provided, and has as outputs the high resolution signals designated Y, R-Y, and B-Y. In the illustrated embodiment, diagonal sampling of elements is used to advantage, as described in the above-referenced patents, by offsetting the basic clock 2712 by one element on successive scanlines (i.e., in alternating fields, for an interlaced signal). The camera circuitry receives sync and drive signals from the subsystem 2713 which is also coupled to clock 2712. At alternate fields the clock is offset. The high resolution luminance signal, Y, is low-pass filtered, as represented by the block 2721 to obtain the standard resolution low frequency luminance signal, as represented by the band 2601 in FIG. 1. It will be understood that the block 2721 can incorporate circuitry such as that shown in FIG. 20 of U.S. Pat. No. 4,628,344 (e.g. circuitry 2010 and 2020) to implement both horizontal and vertical low pass spatial filtering, such as by combining a plurality of adjacent lines (with gaussian weighting, if desired) to implement vertical filtering. The standard resolution low frequency luminance signals are one input to summing circuit 2750, via delay 2760. A difference circuit 2722 is used to subtract the standard resolution low frequency luminance from the high frequency luminance, and the result is low pass filtered to obtain luminance signals in the frequency range as represented by the frequency band 2602 of FIG. 1. [For ease of illustration, equalization delays are omitted.] In accordance with a feature hereof, circuitry is then provided for repeating this portion of the luminance information for two successive frames. In particular, an analog-to-digital converter 2724 digitizes the signals, and they are then coupled to frame delay 2728 and to a summing circuit 2729 which receives the output of both the analog-to-digital converter and the frame delay. Accordingly, the output of summing circuit 2729 is an average of two successive frames. This signal is then coupled to frame store 2725 and to one input of switch 2726. The other input to switch 2726 is the direct output of the summing circuit 2729. A count-to-two frame count (which can also be transmitted, as described below) is coupled to frame store 2725 and switch 2726 so that as the first frame of a pair of frames is output from summing circuit 2729 it is stored in frame store 2725 and also output from switch 2726. During the second frame of a successive pair of frames, the frame store 2725 operates to read out the frame it just stored (i.e., the first frame of the pair), and the switch operates to pass the output of the frame store. Stated another way, during the first frame of a successive pair of frames the frame store 2725 is in a read-in mode and the switch 2726 is operative to pass the output received directly from circuit 2729; whereas during the second frame of the sequential pair of frames the frame store 2725 is in a read-out mode and the switch 2726 is operative to pass the output of the frame store 2725. Accordingly, if the received sequence of frames (within the described frequency band) is 1,2,3,4,5,6 . . . , the output of switch 2726 will be frames 1,1,3,3,5,5 . . . . The output of switch 2726 is coupled to digital-to-analog converter 2727, whose output is, in turn, coupled to another input of summing circuit 2750.

The R-Y high resolution signal is low pass filtered, such as is represented by the block 2731 which can, again, be adapted to provide both horizontal and vertical filtering, as has been previously described. The filtered signal is coupled to analog-to-digital converter 2734, and then to frame delay 2738, summing circuit 2739, frame store 2735, and switch 2736, which are arranged and operate in the manner of the corresponding circuits 2728, 2729, 2725 and 2726 of the luminance processing, to repeat successive frames of averaged R-Y information. The output of switch 2736 is coupled to digital-to-analog converter 2737, whose output is one input to the quadrature modulator 2755. The other input to quadrature modulator 2755 is the output of a modified standard resolution B-Y processing channel which includes low-pass filter 2741, analog-to-digital converter 2744, frame delay 2748, summing circuit 2749, frame store 2745, switch 2746, and digital-to-analog converter 2747, which operate in a manner similar to their counterparts in the modified R-Y processing channel. In the case of B-Y, however, as previously described, less resolution is required, so this signal can be filtered to a lower frequency (again, horizontially and vertically). After the modified standard resolution color difference sigals are quadrature modulated on 3.58 MHz color subcarrier, the result is a further input to the summing circuit 2750. It will be understood that alternate means can be provided for repeating successive frames, before or after the combining of the information components. The output of the summing circuit 2750 can be stored and/or transmitted. If desired, a standard resolution memory (as in FIG. 22 of U.S. Pat. No. 4,628,344) can be employed.

FIG. 3 shows a block diagram of the high resolution processing portion of the encoder of this embodiment, which is used to obtain the signals represented by the frequency band 2603 of FIG. 1. The high resolution luminance signal is coupled to a high-pass filter 2811 to remove the low frequency components that would be redundant with the portion of the information that is sent in the standard resolution channels (e.g. in prior embodiments). Again, for both the luminance and color difference signals, the filtering can be implemented in the vertical as well as the horizontal direction. The filtered signal is coupled to analog-to-digital converter 2813, and then to circuit 2814 which operates to average four successive frames of the high resolution video information. This is done, in the present embodiment, since this information will be transmitted at one-quarter the conventional frame rate (i.e., 7.5 frames per second), so an averaging of the video information at each pixel over four successive frames can be advantageously used to obtain the signals to be stored and transmitted. The circuitry 2814 includes three frame delay circuits 2815, 2816 and 2817, and the input to the first frame delay as well as the outputs of the three frame delays are coupled to summing circuit 2818 to average each pixel value over four successive frames. The output of circuitry 2814 is coupled to high resolution luminance memory 2819, and associated digital-to-analog converter 2819A, which operates in a manner similar to the memories described in the embodiments set forth in the above-referenced patents to generate encoded high resolution information for transmission at a lower frame refresh rate.

The high resolution color difference signal R-Y is high-pass filtered by filter circuitry 2821 for the same reason as was described with respect to the luminance filtering. In this case, however, since the high definition color information cannot be perceived with as high a resolution as the luminance, circuitry 2822 is used for low-pass filtering in both the horizontal and vertical directions, as previously described, e.g. to obtain frames having 525 total lines. Accordingly, the filters 2821 and 2822, considered together, provide a bandpass filtering function. The resultant signal is coupled to analog-to-digital converter 2823, and then to circuitry 2824 which operates in a manner similar to its previously described counterpart (2814) to average four frames before coupling to the high resolution R-Y memory 2829, and associated digital-to-analog converter 2829A.

The high resolution B-Y processing channel is similar to the R-Y processing just described, and includes blocks 2831-2839A which operate in a manner similar to their counterparts 2821-2829A. However, in the case of the B-Y processing, as described above, the maximum necessary resolution is smaller than for the R-Y information. Accordingly, the high-pass filtering in this case can be to a lower frequency and line rate.

It will be understood that the memories, clocked in and out at the desired rates, can be provided, as illustrated in the embodiments previously set forth in the above-referenced patents. As an alternative to continuously sending each component of the high resolution information at a slower rate, each such component can be time-base varied and sent during only during a portion of a cycle.

The delay 2760 (in addition to equalization delays—not shown) in the low resolution luminance channel operates in the manner of delay 2250 (FIG. 22 of U.S. Pat. No. 4,628,344) to maximize the masking of the slow buildup of the higher resolution information in the ultimately displayed image by effectively accelerating the higher resolution portions of the image in the color and detail luminance channels with respect to the low resolution luminance in FIG. 2. A further delay 2790, implemented after summing of the modified standard resolution signals, delays these signals with respect to the high resolution channel, again for the same purpose. The delays, which are preferably one frame duration each in this case, also serve to center low resolution information temporal transients with respect to the frame averaged higher resolution information.

Figure 4:
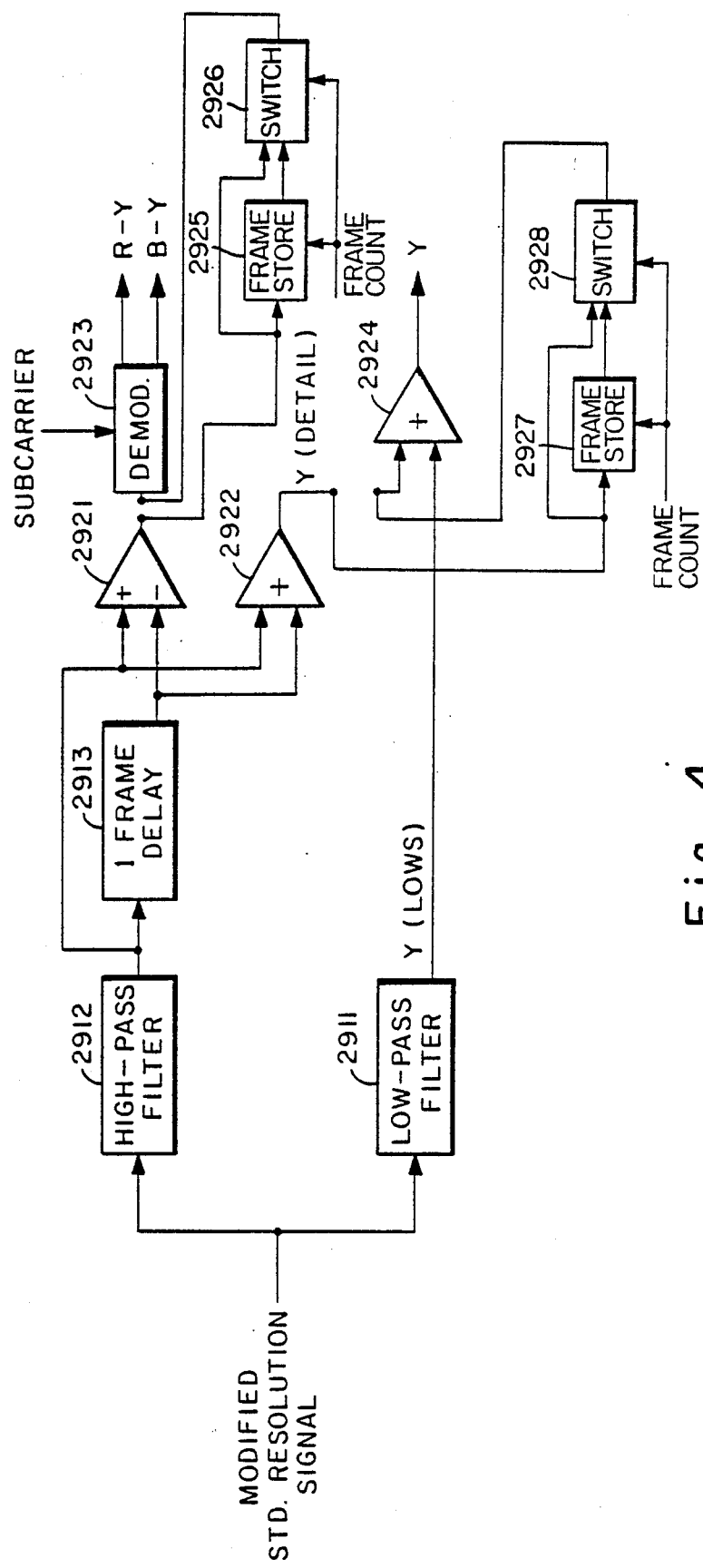
FIG. 4 is a block diagram of a decoder for decoding signals encoded with the encoder of FIGS. 27 and 28.

Referring to FIG. 4, there is shown a block diagram of an embodiment of a decoder for recovering the encoded color and luminance detail signal components which are represented, for example, by the signals in the frequency band 2602 of FIG. 1, and which were encoded using the circuitry of FIG. 2. High resolution receivers, as well as enhanced standard resolution receivers, will have such a decoder. The received modified standard resolution signal is low pass filtered by filter 2911 and high pass filtered by filter 2912, to separate, in this embodiment, the components above and below 2.5 megahertz. The output of high-pass filter 2912 is coupled to a one frame delay 2913 and also to the positive input terminal of difference circuit 2921 and to one input terminal of summing circuit 2922. The output of one frame delay 2913 is coupled to the other input terminal of summing circuit 2922, and also to the negative input terminal of difference amplifier 2921. The output of summing circuit 2922 is coupled via frame store 2925 and switch 2926 to one input of another summing circuit 2924 which receives as its other input, the output of low-pass filter 2911. The output of difference circuit 2921 is coupled via frame store 2927 and switch 2928 to quadrature demodulator 2923 which also receives the conventionally regenerated color subcarrier.

In operation, the successive identical frames of color and detail luminance video information in the frequency band 2602 is recovered by adding and subtracting successive frames to separate the color difference signals from the standard resolution detail signals. In particular, since the phase of the color subcarrier reverses during the successive identical frame pair, the addition of successive frames will add the color signal to itself out of phase, thereby leaving the standard resolution luminance detail signals. The latter can then be added to the low frequency luminance, by summing circuit 2924, to obtain the standard resolution luminance. Also, by subtracting successive identical frames, standard resolution luminance detail will cancel, and the out-of-phase color signals will add, so that the color signals are cleanly recovered. A transmitted frame count (1 or 2) can be used to identify each consecutive pair of identical frames. Alternatively, consecutive identical frames can be detected by other means at the receiver, such as by using the color subcarrier phase with respect to sync. The frame stores 2925 and 2927, and respective associated switches, 2926 and 2928, operate like the similar circuitry in FIG. 27. These circuits are controlled by the frame count signal to pass and store the frames generated from combining successive identical frames, and to then read out the stored frame (during the time that non-identical successive frames are being combined). Again, equalization delays are not shown. For high resolution receivers, the low and high resolution signals can be combined, using techniques similar to those described in conjunction with FIG. 23 of U.S. Pat. No. 4,628,344, to recover the high resolution information for display on a high resolution display. If diagonal sampling was used, a corresponding alternating line offset would be used in the receiver display.

It will be recognized by those skilled in the art that further variations can be implemented within the spirit and scope of the invention. For example, if required by broadcast standards a "high resolution signal killer" could be utilized in high definition receivers when low resolution broadcasts are being received. Further, the standard frame rate can be other than the 30 frames per second NTSC rate used in the U.S., and the invention has applicability to any type of video system. Finally, it is noted that integrated circuit technology can be employed to implement some or all of the encoder or the decoder, such as for home receiver use.

I claim:

1. Apparatus for encoding and decoding a video signal, representative of an image, comprising:
   (A) an encoder, including:
      means responsive to said video signal for deriving a low frequency luminance signal;
      means for generating a combined chrominance and detail luminance signal by combining a chrominance signal derived from the video signal and an unmodulated detail luminance signal derived from the video signal, the combined signals having frequency spectrums which overlap;
      means for producing output frames of said low frequency luminance signal at a fast frame refresh rate;
      means for producing output frames of said combined chrominance and detail luminance signal at a slow frame refresh rate, including means for generating frames of detail luminance signal which repeat once each, and means for generating frames of chrominance signal which repeat once each, but with a phase-reversed carrier during the repeat frames; and
   (B) a decoder, including:
      means responsive to said frames of combined chrominance and detail luminance signal at said slow frame refresh rate for separating said combined signals and producing separated chrominance and detail luminance signals at said fast frame refresh rate; and
      means responsive to the low frequency luminance signal and the separated detail luminance signal for generating a composite luminance signal.

2. Apparatus as defined by claim 1, wherein said fast frame refresh rate is thirty frames per second and said slow frame refresh rate is fifteen frames per second.

3. Apparatus as defined by claim 1, wherein said means for producing output frames of said combined chrominance and detail luminance signal at a slow frame refresh rate further comprises means for averaging successive frames of said chrominance signal and of said detail luminance signal before the respective repeating thereof.

4. Apparatus as defined by claim 3 wherein said low frequency luminance signal has a bandwidth of about 2.5 MHz, and said combined chrominance and detail luminance signal has a bandwidth of about 1.7 MHz.

5. Apparatus as defined by claim 4 wherein said means in said decoder for separating said combined signals includes means for adding and subtracting repeated frames of said combined signals.

6. Apparatus as defined by claim 1 wherein said low frequency luminance signal has a bandwidth of about 2.5 MHz, and said combined chrominance and detail luminance signal has a bandwidth of about 1.7 MHz.

7. Apparatus as defined by claim 1 wherein said means in said decoder for separating said combined signals includes means for adding and subtracting repeated frames of said combined signals.

8. Apparatus as defined by claim 1, further comprising means in said encoder responsive to said video signal for deriving high resolution luminance and chrominance signals; and means in said encoder for producing output frames of said high resolution luminance and chrominance signals at a frame refresh rate which is slower than said slow frame refresh rate.

9. A method for encoding a video signal, representative of an image, comprising the steps of:
   deriving, from said video signal, a low frequency luminance signal;
   generating a combined chrominance and detail luminance signal by combining a chrominance signal derived from the video signal and an unmodulated detail luminance signal derived from the video signal, the combined signals having frequency spectrums which overlap;
   producing output frames of said low frequency luminance signal at a fast frame refresh rate; and
   producing output frames of said combined chrominance and detail luminance signal at a slow frame refresh rate, including generating frames of detail luminance signal which repeat once each, and generating frames of chrominance signal which repeat once each, but with a phase-reversed carrier during the repeat frames.

10. The method as defined by claim 9, further comprising the step of transmitting the output frames.

11. The method as defined by claim 9, wherein said fast frame refresh rate is thirty frames per second and said slow frame refresh rate is fifteen frames per second.

12. The method as defined by claim 10, wherein said fast frame refresh rate is thirty frames per second and said slow frame refresh rate is fifteen frames per second.

13. The method as defined by claim 9, wherein said step of producing output frames of said combined chrominance and detail luminance signal at a slow frame refresh rate further comprises averaging successive frames of said chrominance signal and of said detail luminance signal before the respective repeating thereof.

14. The method as defined by claim 9, wherein said low frequency luminance signal has a bandwidth of about 2.5 MHz, and said combined chrominance and detail luminance signal has a bandwidth of about 1.7 MHz.

15. The method as defined by claim 9, further comprising the steps of deriving high resolution luminance and chrominance signals; and producing output frames of said high resolution luminance and chrominance signals at a frame refresh rate which is slower than said slow frame refresh rate.

16. The method as defined by claim 13, further comprising the steps of deriving high resolution luminance and chrominance signals; and producing output frames of said high resolution luminance and chrominance signals at a frame refresh rate which is slower than said slow frame refresh rate.

17. For use in decoding a video signal representative of an image which has been encoded by: deriving, from the video signal a low frequency luminance signal; deriving, from the video signal a combined chrominance and unmodulated detail luminance signal; producing output frames of the low frequency luminance signal at a fast frame refresh rate; and producing output frames of said combined chrominance and detail luminance signal at a slow frame refresh rate, the output frames of said combined chrominance and detail luminance signal at a slow frame refresh rate being produced by generating frames of detail luminance signal which repeat once each, and generating frames of chrominance signal which repeat once each, but with a phase-reversed carrier during the repeat frames; a decoder, comprising:
   means responsive to said frames of combined chrominance and detail luminance signal at said slow frame refresh rate for adding and subtracting repeated frames of said combined signals to produce separated chrominance and detail luminance signals at said fast frame refresh rate; and
   means responsive to the low frequency luminance signal and the separated detail luminance signal for generating a composite luminance signal.

18. The decoder as defined by claim 17, wherein said fast frame refresh rate is thirty frames per second and said slow frame refresh rate is fifteen frames per second.

19. The decoder as defined by claim 17, further comprising means for displaying the recovered chrominance and composite luminance signals.

20. The decoder as defined by claim 17, further comprising means for displaying the recovered chrominance and composite luminance signals.

21. A method for encoding, transmitting, receiving, and decoding a video signal, representative of an image, comprising the steps of:
   deriving, from said video signal, a low frequency luminance signal;
   generating a combined chrominance and detail luminance signal by combining a chrominance signal derived from the video signal and an unmodulated detail luminance signal derived from the video signal, the combined signals having frequency spectrums which overlap;
   producing output frames of said low frequency luminance signal at a fast frame refresh rate;
   producing output frames of said combined chrominance and detail luminance signal at a slow frame refresh rate, including generating frames of detail luminance signal which repeat once each, and generating frames of chrominance signal which repeat once each, but with a phase-reversed carrier during the repeat frames;
   transmitting the output frames;

receiving the output frames;

separating said combined signals and producing separated chrominance and detail luminance signals at said fast frame refresh rate; and generating a composite luminance signal from the low frequency luminance signal and the separated detail luminance signal.

22. The method as defined by claim 1, wherein said fast frame refresh rate is thirty frames per second and said slow frame refresh rate is fifteen frames per second.

23. The method as defined by claim 21, wherein said step of producing output frames of said combined chrominance and detail luminance signal at a slow frame refresh rate further comprises averaging successive frames of said chrominance signal and of said detail luminance signal before the respective repeating thereof.

24. The method as defined by claim 21, wherein said low frequency luminance signal has a bandwidth of about 2.5 MHz, and said combined chrominance and detail luminance signal has a bandwidth of about 1.7 MHz.

25. The method as defined by claim 2, wherein said step of separating said combined signals includes adding and subtracting repeated frames of said combined signals.

26. The method as defined by claim 21, further comprising the steps of deriving high resolution luminance and chrominance signals; producing output frames of said high resolution luminance and chrominance signals at a frame refresh rate which is slower than said slow frame refresh rate; transmitting the frames of high resolution luminance and chrominance signals; and receiving the frames of high resolution luminance and chrominance signals.

27. For use in a system which receives a high resolution video signal, a method for producing an improved luminance signal, comprising the steps of:

deriving from said high resolution video signal a low frequency luminance signal in a first frequency range by low pass filtering the luminance component of said high resolution video signal in both the vertical and horizontal directions;

deriving from said high resolution video signal a detail luminance signal in a second frequency range that is above said first frequency range but below the high frequency end of said high resolution video signal; and combining said low frequency luminance signal and said detail luminance signal to obtain an improved standard resolution luminance signal.

28. The method as defined by claim 27, wherein said detail luminance signal is produced at a slow frame refresh rate as compared to said low frequency luminance signal.

29. The method as defined by claim 28, wherein said first frequency range about 0 to 2.5 MHz and said second frequency range is about 2.5 MHz to 4.2 MHz.

30. The method as defined by claim 27, wherein said first frequency range is about 0 to 2.5 MHz and said second frequency range is about 2.5 MHz to 4.2 MHz.

31. The method as defined by claim 27 wherein said deriving of a detail luminance signal includes subtracting the low frequency luminance signal from the luminance component of said high resolution video signal and then low pass filtering the result in both the horizontal and vertical directions.

* * * * *